Patented Sept. 8, 1925.

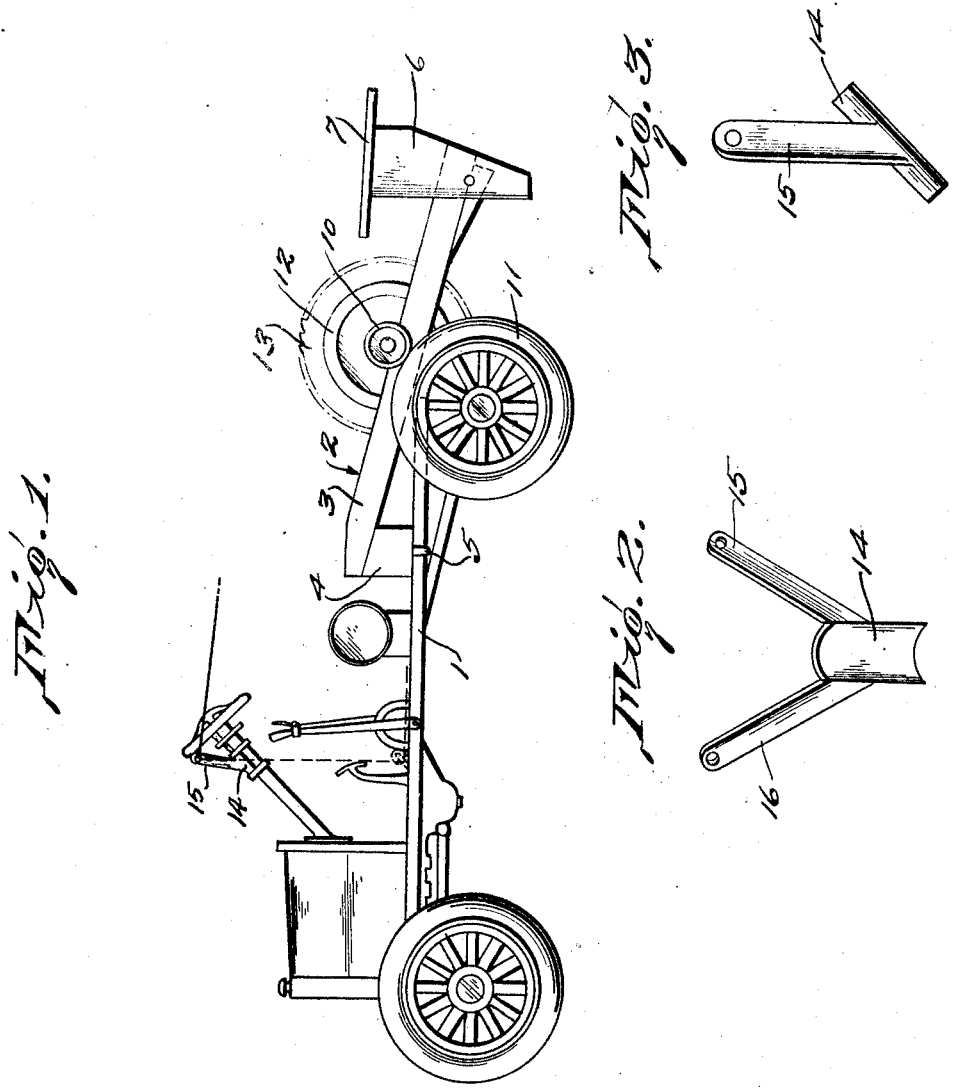

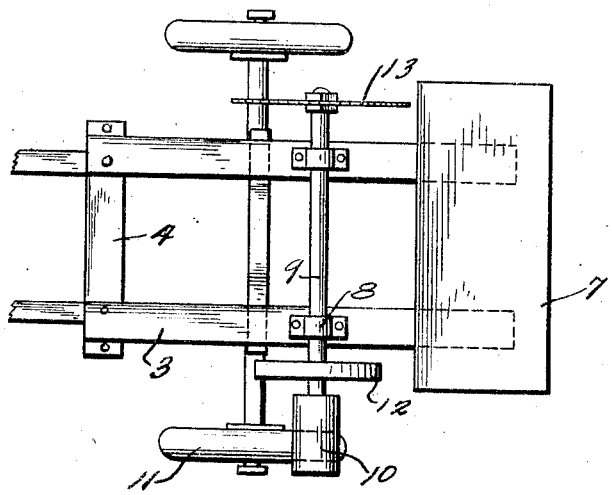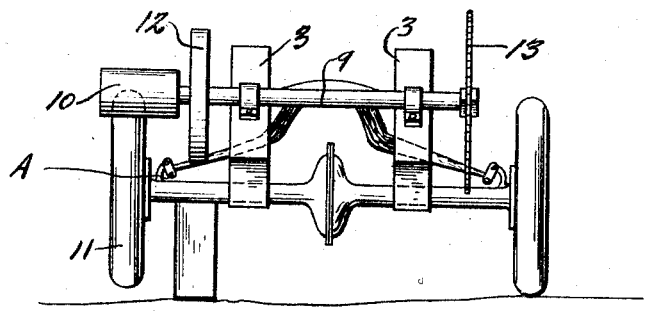

1,552,989

UNITED STATES PATENT OFFICE.

WALTER HUGHES, OF SOUTH SEAVILLE, NEW JERSEY.

FRICTION DRIVE WOOD-SAWING MACHINE.

Application filed October 18, 1923. Serial No. 669,299.

*To all whom it may concern:*

Be it known that I, WALTER HUGHES, a citizen of the United States, residing at South Seaville, in the county of Cape May and State of New Jersey, have invented certain new and useful Improvements in Friction Drive Wood-Sawing Machines, of which the following is a specification.

This invention relates to friction drive wood sawing machine and more particularly to a sawing apparatus especially designed to be attached to the chassis of an automobile and suspended from the rear thereof, whereby driving power may be received from the rear wheel of the automobile to drive the saw.

One of the objects of the invention is to provide an apparatus of this character which will not require a belt but which will be frictionally driven directly from one of the rear wheels of an automobile.

Another object of the invention is to provide a structure of this character which will be simple and inexpensive to manufacture and may be quickly mounted in position for operation, and will be readily adapted to withstand the rough usage to which devices of this character are ordinarily subjected.

A further object of the invention is to provide a structure of this character which may be transported from place to place without the consumption of much time by simply lifting the frame and placing a block between the axle and spring shackle, and the pulley is disengaged from the auto wheel, to permit the auto to travel over the roads without damaging the wood sawing attachment.

Other objects of the invention will appear upon consideration of the following detailed description and accompanying drawings, in which, Figure 1 is a side elevation, Figure 2 is a detailed view of the throttle control lever, Figure 3 is a side elevation of the same, Figure 4 is a plan view of the structure, and Figure 5 is a rear end elevation.

Referring to the drawings by numerals, the automobile chassis 1 may be of any preferred type and the attachment 2 is adapted to be mounted at the rear thereof. The attachment consists of a frame comprising the longitudinal frame bars 3 and a front cross bar 4. The front cross bar is attached to the side frame bars 3 so that the latter are extended rearwardly at an angle with respect to the horizontal line of the chassis, and the cross bar is fastened to the chassis by suitable clips 5 which are adapted to be readily removable so that the device may be mounted or demounted when desired.

The rear ends of the side frame bars 3 extend beyond the rear axle of the automobile and the terminals of the side bars carry the brackets 6 which support the table 7 upon which the logs or timber are rested when they are to be sawed. Mounted in bearings 8 on the side bars 3, is a drive shaft 9 which extends transversely across the frame and has one end provided with a friction pulley 10 adapted to engage the periphery of one of the rear wheels 11. The shaft 9 is also provided with a flywheel 12 and the opposite end of the shaft is equipped with a circular saw 13, the edge of which is in close proximity to the forward edge of the table 7.

Mounted upon the steering post is a bracket 14 connected to the gas control levers, and this bracket is equipped with arms 15 and 16 to which flexible cables may be attached and extended rearwardly, whereby the operator of the saw may control the throttle on the steering post and thus govern the speed of the apparatus.

When the device is in use, the rear axle will be jacked up and raised off the ground so that the rear wheel may rotate freely. Since the friction pulley pin will be in engagement with one of the wheels 11 it will be obvious that rotary motion will be imparted to the shaft 9, thus turning the circular saw 13 so that logs or timbers placed on the table 7 will be thrust forwardly to engage the saw, thus cutting the logs or timbers as desired.

For the purpose of transporting this device it is simply necessary that the frame be lifted and a block placed at A between the axle and spring shackle, and the pulley is then disengaged from the auto wheel, thereby eliminating the loss of time in transporting the device from place to place.

Minor changes may be made in the details of construction without departing from the spirit of the invention or the scope of the claim hereunto appended.

What I claim as new and desire to secure by Letters Patent, is:

An apparatus of the character described comprising in combination with an automobile chassis having power driven rear wheels, a frame including side frame bars mounted upon the chassis and extending rearwardly therefrom, a cross bar removably attached to the said chassis and secured to the forward ends of the said side bars, the said side bars being disposed at an angle with respect to the horizontal line of the said chassis, a shaft mounted in bearings on the said side bars and extending transversely of the side bars, a friction pulley mounted on the shaft and engageable with one of the rear wheels of the automobile, a circular saw mounted on the opposite end of the shaft, brackets attached to the rearward ends of the said side bars, and a horizontal table mounted upon the said brackets, having its forward edge in close proximity to the cutting edge of the said saw.

In testimony whereof, I have affixed my signature.

WALTER HUGHES.